United States Patent [19]
Raun

[11] 3,794,732
[45] Feb. 26, 1974

[54] RUMINANT FEED UTILIZATION IMPROVEMENT

[75] Inventor: Arthur P. Raun, New Palestine, Ind.

[73] Assignee: Eli Lilly and Company, Indianapolis, Ind.

[22] Filed: Jan. 24, 1972

[21] Appl. No.: 220,304

[52] U.S. Cl. ............................................. 424/283
[51] Int. Cl. .......................................... A61k 21/00
[58] Field of Search .................................. 424/283

[56] References Cited
FOREIGN PATENTS OR APPLICATIONS
7,012,108   2/1971   Netherlands OTHER PUBLICATIONS
Wallace–J. Animal Science Vol. 31 Dec. 1970 pages 1118–1126.

*Primary Examiner*—Sam Rosen
*Attorney, Agent, or Firm*—Joseph A. Jones; Leroy Whitaker; Everet F. Smith

[57] ABSTRACT

Ruminant animals having a developed rumen function convert their feed more efficiently to energy when orally treated with an antibiotic chosen from among A204, X537A, dianemycin, monensin, nigericin, and X206 and their physiologically acceptable salts and esters.

7 Claims, 3 Drawing Figures

RUMINANT FEED UTILIZATION IMPROVEMENT

BACKGROUND OF THE INVENTION

For many years, the animal science industry has tried to increase the efficiency of feed utilization in animals. The ruminant animals are of particular economic importance, and so, necessarily, is the efficiency of the utilization of ruminants' feed.

In the course of investigating the efficiency of feed use, the mechanism by which ruminants digest and degrade the components of their feed to form molecules which can be metabolically utilized has been intensively studied. The mechanism of carbohydrate utilization is now well known. Microorganisms in the rumen of the animal ferment the carbohydrate to produce monosaccharides, and then degrade the monosaccharides to pyruvate compounds.

Pyruvate is then metabolized by microbiological processes to either acetate or propionate compounds, which may be either acids or other forms of the radicals. Two acetate radicals may be combined thereafter, still in the rumen, to form butyrates. Leng, "Formation and Production of Volatile Fatty Acids in the rumen," *Physiology of Digestion and Metabolism in the Ruminant* (Phillipson et al. ed.), Oriel Press, pages 408–10.

The animal can utilize butyrate, propionate, and acetate with differing degrees of efficiency. Utilization of those compounds, which are collectively known as volatile fatty acids (VFA), occurs after absorption from the gut of the animal. Butyrate is utilized most efficiently, and acetate the least effciently. However, the relative efficiency of use of butyrate is negated by the inefficiency of the manufacture of butyrate, which must be made from acetate in the rumen.

One of the major inefficiencies in the rumen is in the manufacture of acetate. Since it is made by the degradation of a pyruvate molecule, each molecule of acetate which is produced is accompanied by a molecule of methane. Most of the methane produced is lost through eructation. Since butyrate is made from two molecules of acetate, each molecule of the relatively efficiently used butyrate involves the loss to the animal of two molecules of methane, with all of the associated energy.

Thus, the efficiency of carbohydrate utilization (carbohydrates being the major nutritive portion of ruminant animals' feed) can be increased by treatments which encourage the animal to produce propionate rather than acetate from the carbohydrates. Further, the efficiency of feed use can be effectively monitored by observing the production and concentration of propionate compounds in the rumen. If the animal is making more propionates, it will be found to be using its feed more efficiently.

The relative efficiency of utilization of the VFA's is discussed by McCullough, *feedstuffs*, June 19, 1971, page 19; Eskeland et al., J. An. Sci. 33, 282 (1971); and Church et al., *Digestive Physiology and Nutrition of Ruminants*, vol. 2 (1971), pages 622 and 625.

It has been well established that the efficiency of feed utilization by a ruminant animal can be readily determined by chemical analysis of the fermentation occurring in the rumen. For example, Marco et al., U.S. Pat. No. 3,293,038 taught the use of alkylated phenols as feed additives for improved feed efficiency. They illustrated an in vitro rumen fermentation test, and in vivo animal feeding studies, which were evaluated by chemical analysis of the rumen contents for acetate and propionate.

O'Connor et al., *J. Animal Sci.*, 1970, 812–18, reported the results of in virto rumen fermentation tests on a large number of compounds. German Pat. No. 2,059,407 reported the use of a hemiacetal of chloral and starch as a feed additive which inhibits the formation of methane and produces higher than normal levels of propionic and butyric acids.

Marco et al., U.S. Pat. No. 3,522,353 taught the use of halogenated acyclic carboxylic acids as feed additives. It was there shown that the compounds produced in vitro increases in propionate production, and also increased feed efficiency in animals fed those compounds. To a similar effect is Erwin et al., U.S. Pat. No. 3,564,098.

The condition called ketosis is a manifestation of faulty VFA balance, which amounts to a clinical illness. Ruminant animls maintained on a diet which naturally degrades to a high proportion of acetate and low proportion of propionate are likely to suffer from ketosis. Dairy animals are particularly prone to the condition. Under stress, such as the onset of high lactation, too little propionate is available. As a result, more acetate is used leading to a high concentration of ketones in the body and especially in the bloodstream. A treatment for ketosis is to feed propionic acid, a precursor of propionic acid, or glucose which tends to metabolize to propionates. Clearly, if the rumen could naturally be encouraged to produce more propionate than normal from the diet, ketosis incidence could be reduced.

SUMMARY

I have now discovered a novel method of increasing the efficiency of feed utilization by ruminant animals having a developed rumen function. An antibiotic chosen from the group A204, dianemycin, monensin, X537A, nigericin and X206 and their physiologically-acceptable salts and esters is orally administered to the ruminant animals whose feed efficiency is to be increased.

DESCRIPTION OF THE PREFERRED EMBODIMENT

Figure 1:
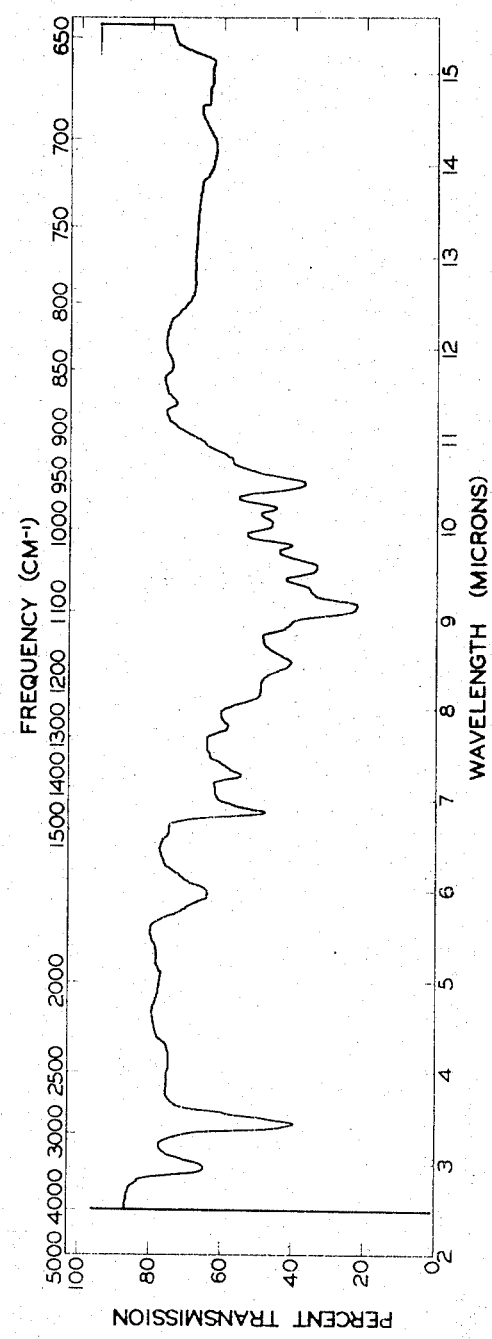

I have invented a method of improving feed utilization of ruminants having a developed rumen function which comprises oral administration to the ruminants of an effective amount of a compound chosen from the group A204, dianemycin, X537A, monensin, nigericin, and X206 and their physiologically acceptable esters and salts. The preferred antibiotics of my method are monensin and A204.

My invention is useful only to ruminants which have a developed rumen function. Young ruminants, basically those still unweaned, function as monogastric animals. They use their simple liquid feeds just as monogastric animals do. As the young ruminants begin to eat solid feed, containing cellulose, starch, and other carbohydrates, the function of the rumen begins to develop, and the microbiological population of the rumen begins to build up. After the animal has eaten solid feed for a time, its rumen function reaches its full development and continues to operate throughout the animal's life.

My invention is functional in all of the ruminants, that is, the animals which have multiple stomachs, one of which is a rumen. The economically-important ruminant animals are cattle, sheep, and goats. My method is operable when the feed-utilization improving compound is fed at rates from about 0.05 mg./kg./day to about 5.0 mg./kg./day. While that range of rates is functional, the preferred range of rates is from about 0.1 to about 2.5 mg./kg./day.

The compounds which I here disclose as effective in improving the utilization of ruminants' feed are all antibiotics of related structures. Each of the antibiotic compounds is made up of a chain of oxygen-containing rings, with a single carboxylic acid moiety at one end of the molecule and one or more hydroxyl moieties at the other end of the molecule.

An unusual complex salt is formed with monovalent metal ions by all of the antibiotics active in my method. A complex is formed between one molecule of the antibiotic and one ion of the metal. The oxygen atoms in the linked rings of the antibiotic molecule complex with the metal ion. Thus, the antibiotic molecule forms a loop or a ball around the ion. A weak covalent bond is formed between the ion and each oxygen atom. The ends of the molecule are fastened together by hydrogen bonding between the carboxyl group and a hydroxyl group at the opposite end of the antibiotic molecule. Thus, the ion is completely enclosed within the antibiotic molecule. The unusual result is that the metal salt of the antibiotic is insoluble in water but is soluble in organic solvents.

The ion-transport properties of the antibotic are significantly affected by its ability to form these unusual complexes. Pinkerton et al., *J. Mol. Biol.* 49, 533–46 (1970).

It is expected that other antibiotics which have the general structure and property just described will be useful in my method. Such compounds clearly fall within the scope of my invention.

Dianemycin has very recently been structurally characterized.

Dianemycin is a fermentation product of an organism which is a strain of *Streptomyces hygroscopicus*, and is on unrestricted deposit under the identifying number NRRL 3444 at the Northern Utilization Research and Development Div., Agricultural Research Service, U.S. Department of Agriculture, 1815 North University Street, Peoria, Ill. 61604.

Nigericin has been known at various times as helexin C, antibiotic X464, antibiotic K178, polyetherin A, and azalomycin M. It has been structurally characterized by Steinrauf et al., *Biochemical and Biophysical Research Communications* 33, 29 (1968). The structure is shown below.

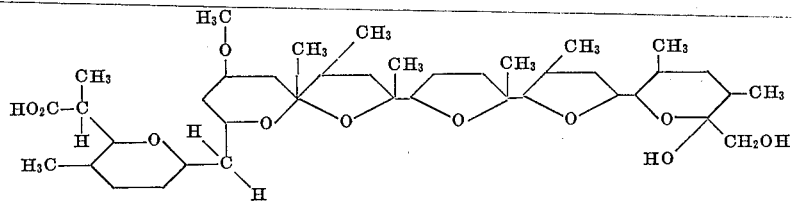

Nigericin was originally reported by Harnes, et al., *Antibiotics and Chemotherapy I*, 594–96 (1951). It has also been described in Gorman et al., U.S. Pat. No. 3,555,150.

The organism which produces nigericin, a strain of *Streptomyces violaceoniger*, is on unrestricted deposit as NRRL B1356 at the Northern Research and Development Div., Agricultural Research Service, United States Department of Agriculture.

Nigericin is produced by fermentation. It can be produced in several types of fermentation media. It is not produced efficiently in synthetic media, but requires a complex nitrogen source such as fishmeal, distiller's residues, cottonseed meal, or soybean flour. The medium must also include a carbon source such as starch, a sugar, or the like.

Nigericin is best produced by first inoculating an aerated starter tank with a vegetative inoculum. The contents of the starter tank is used, when the fermentation is proceeding actively, to inoculate a production tank. The production tank is maintained at about 28°C., and is supplied with sterile air at a rate from about half to about twice the tank's volume per minute.

The nigericin is harvested after about 4 to 6 days of growth. Most of the activity is in the cells, which are filtered out of the broth. Extraction with an alcohol, concentration, transfer of the activity first to aqueous alcohol and then to benzene and chromatography isolate the nigericin.

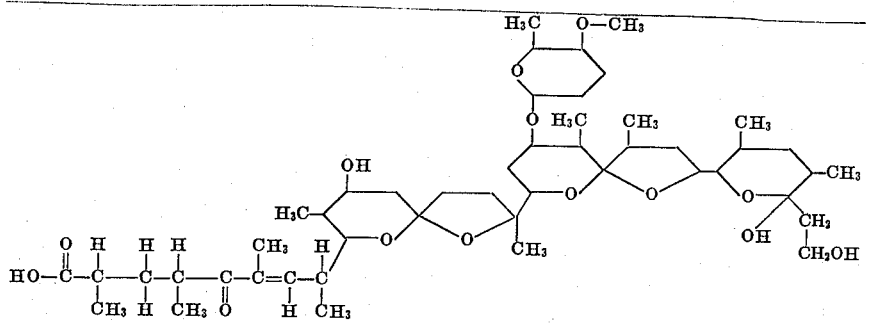

Steinrauf et al., *Biochemical and Biophysical Research Communications* 45, 1279–87 (1971).

Gorman et al., U.S. Pat. No. 3,577,531 taught the description, preparation, and characteristics of dianemycin, and referred to an earlier article about it by Lardy et al., *Arch. Biochem. Biophysics* 78, 587–97 (1958).

The example below shows in more detail the method of producing nigericin.

EXAMPLE 1

A vegetative inoculum is prepared by growing the *Streptomyces* organism known as NRRL B1356 on agar slants made up of 10 g. of dextrin, 2 g. of an enzyme-digested casein, 1 g. of beef extract, 1 g. of yeast extract, and sufficient water to make 1 liter. The slants are grown for 3 days at 28°C.

The spores are harvested from the slants and transferred to a 30-liter starter tank containing the following sterile medium.

| | |
|---|---|
| 3% | soybean flour |
| 2% | brown sugar |
| 0.5% | cornsteep liquor |
| 0.1% | K₂HPO₃ tap water |

The starter tank is grown for 3 days at 28°C. One cubic foot per minute of sterile air is bubbled through the medium.

The starter tank is transferred aseptically to a 550-liter production tank containing the above medium. The fermentation is allowed to continue for 5 days at 28°C., while 20 c.f.m. of sterile air is bubbled through the medium.

The broth is filtered with diatomaceous filter aid. The wet filter cake is extracted with 250 l. of methanol and the extract is concentrated to 45 l. The concentrated extract is extracted with an equal volume of butyl acetate, which is then washed with 0.2M K₂HPO₄, washed with water, and concentrated to a paste. This residue is extracted with 4.5 l. of petroleum ether, which is then evaporated to 1 kg. of oil.

The oil is partitioned between 2 l. of two parts of 90 percent aqueous methanol and three parts of petroleum ether, and then the petroleum ether is extracted twice with more 90 percent aqueous methanol. All the aqueous methanol portions are combined and concentrated to an oil, which is dissolved in benzene and adsorbed on an 1,800 g. activated alumina column. Elution with, in succession, benzene, benzene + 10% ether, ether, and ether + 10% ethanol recovers all of the nigericin activity as the mixed sodium-potassium salt, m.p. 225°-35°C. Conversion to the free acid, m.p. 170°-72°C., is accomplished by partitioning the salt between either and dilute hydrochloric acid.

Monensin was described by Haney et al., U.S. Pat. No. 3,501,568. The substance known as monensin is actually a mixture of four factors. The structure shown below is the acid form of factor A monensin.

The A204 mixture of antibiotics is comprised mainly of factors A204 I and A204 II. Antibiotic factor A204 I is produced in greater abundance than factor A204 II, which commonly is produced in amounts up to about 5 percent of the total antibiotic A204 mixture isolated. Other antibiotic factors produced in the A204 fermentation occur in such minor amounts that their recovery is unrewarding.

In this specification and claims, the term A204 will be used to include both A204 I and A204 II. Data is presented to show that both A204 I and A204 II are effective in my method.

Antibiotic A204 I is a white, crystalline solid, melting at about 96°-98°C. when crystallized from ethyl ether. A204 I is soluble in dimethylformamide, dimethylsulfoxide; esters such as methyl acetate, ethyl acetate, amyl acetate and the like; ketones such as acetone, methyl ethyl ketone and methyl isobutyl ketone; the halogenated hydrocarbons such as chloroform, carbon tetrachloride and ethylene dichloride; and the aromatic hydrocarbons such as benzene, toluene and the xylenes. It is slightly soluble in the alcohols such as methanol, ethanol, isopropanol and t-butanol and is very slightly soluble in water.

The specific optical rotation of A204 I, as the crystalline free acid when dried at room temperature in vacuo over anhydrous calcium chloride for 15 hours, is $[\alpha]_D^{25}$ + 68.12° (C = 1 percent, w./v. in methanol).

Electrometric titration of antibiotic A204 I in a 66 percent dimethylformamide-water solution revealed the presence of one titratable group of $pK'a = 6.1$.

The precise molecular weight of antibiotic A204 I, has not yet been determined. The molecular weight calculated from the titration data is about 900. X-ray analysis of the crystalline silver and sodium salts indicated an average molecular weight of 937.

An average of several elemental analyses of crystalline A204 I, dried in vacuo at about 80°C. over phosphorous pentoxide, gave the following values:

| ELEMENT | PERCENT |
|---|---|
| Carbon | 61.74 |
| Hydrogen | 9.37 |
| Oxygen | 28.38 |

Chemical and physical analyses of crystalline A204 I indicate the presence of 4 to 5 methoxy groups.

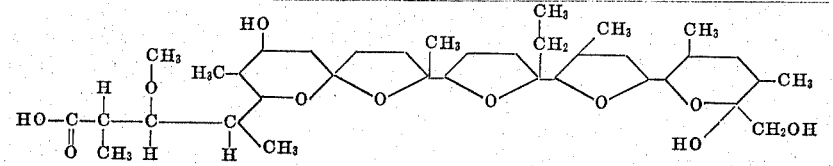

Monensin is produced by fermentation by an organism which is on unrestricted deposit under the number ATCC 15413 at the American Type Culture Collection, 12301 Parklawn Drive, Rockville, Maryland 20852.

The four factors of monensin are included in the term, monensin. Administration of any or all of the four factors for the improvement of feed utilization by ruminants is within the scope of my invention.

The antibiotic known as A204 has not yet been structurally characterized. Therefore, the following description of the properties of the known factors of A204 is given.

A204 has no characteristic ultraviolet absorption pattern.

The infrared absorption spectrum of A204 I as the crystalline free acid in chloroform is shown in FIG. 1 of the accompanying drawings. The distinguishable bands in the infrared spectrum over the range of 2.0 to 15.0 microns are as follows: 2.95; 3.43; 5.95; 6.87; 7.26; 7.80; 8.52; 8.95; 9.17; 9.34; 9.59; 9.82; 10.07; 10.24; 10.51; 10.77; 11.40; and 11.80 microns.

Paper chromatography of antibiotic A204 I on Whatman No. 1 paper gave the following $R_f$ values: $R_f$=0.14 in a solvent of water, methanol, acetic acid, and benzene in a volume ratio of 72:24.5:3:0.5; $R_f$=0.87 in a solvent of 10 percent aqueous n-propanol; $R_f$=0.33 in a solvent containing water, methanol, and acetone in a ratio of 12:3:1 (solution was adjusted to pH 10.5 with NH₄OH and then to pH 7.3 with H₃PO₄). In determining the foregoing values, the antibiotic was applied to the paper in a methanolic solution. Bioautographs were obtained by placing the paper chromatogram on agar plates seeded with *Bacillus subtilis* as the test organism.

When A204 I is subjected to thin-layer chromatography on silica gel plates in an ethyl acetate solvent, utilizing a vanillin or sulfuric acid spray as a detector, it has an $R_f$ value of about 0.8.

The sodium salt of antibiotic A204 I is a white, crystalline solid, melting at about 178–179°C. and having a molecular weight of about 960 as determined by X-ray analysis. The sodium salt is soluble in dimethylformamide, dimethyl sulfoxide; esters such as ethyl acetate, methyl propionate and amyl acetate; the commonly employed ketone solvents such as acetone, methyl ethyl ketone and methyl isobutyl ketone; the halogenated hydrocarbon solvents such as chloroform, carbon tetrachloride and ethylene dichloride; and the aromatic hydrocarbons such as benzene, toluene and the xylenes. Like the free acid form of A204 I, it is soluble in diethyl ether and only slightly soluble in the common alcohol solvents such as methanol, ethanol, isopropanol and n-butanol. The A204 I sodium salt is highly insoluble in water.

The specific optical rotation of the crystalline sodium salt of A204 I, dried at room temperature in vacuo over anhydrous calcium chloride for about 15 hours, is $[\alpha]_D^{25} + 54.95°$ (C = 2 percent, w./v. in methanol).

Figure 2:
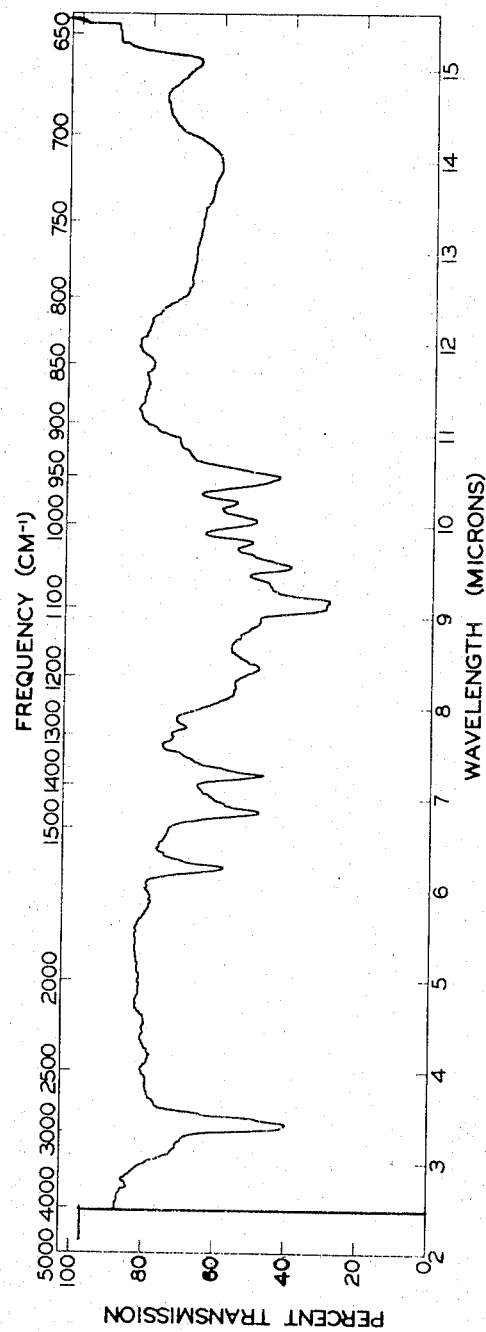

The infrared absorption spectrum of the sodium salt of antibiotic A204 I in chloroform is shown in FIG. 2 of the accompanying drawings. The distinguishable bands in the infrared spectrum over the range of 2.0 to 15.0 microns are as follows: 3.1–3.2 (broad); 3.44; 6.26; 6.87; 7.29; 7.67; 7.79; 8.45; 8.96; 9.11; 9.18; 9.36; 9.56; 9.82; 10.05; 10.26; 10.54; 10.95; and 11.77 microns.

The molecular weight of the hydrated crystalline silver salt of antibiotic A204 I, determined from x-ray data, is about 1099. Crystals of the silver salt are colorless, but are sensitive to light and X-rays, turning dark brown after two days irradiation in air. The observed density of the silver salt, measured by flotation in aqueous $ZnCl_2$ is 1.293 g./cm.$^3$ Antibiotic A204 II as isolated from the A204 mixture of antibiotics is obtained as the mixed sodium-potassium salt having a melting point of about 177°–179°C. when crystallized from acetone.

The A204 II mixed sodium and potassium salt has solubility characteristics similar to factor A204 I and the sodium salt thereof. It is very insoluble in water and slightly soluble in alcohol solvents such as methanol and ethanol. It is soluble in ether; the commonly employed ester solvents such as ethyl acetate and amyl acetate; the ketone solvents such as acetone, methyl ethyl ketone and methyl isobutyl ketone; the halogenated hydrocarbon solvents such as chloroform, carbon tetrachloride and ethylene dichloride; the aromatic hydrocarbon solvents such as benzene, toluene and the xylenes; and the commonly employed solvents dimethylformamide and dimethyl sulfoxide.

The specific optical rotation of the mixed sodium-potassium salt of A204 II dried at room temperature in vacuo over anhydrous calcium chloride for about 15 hours was found to be $[\alpha]_D^{25} + 42.3°$ (C equals 1 percent w./v. in methanol).

Electrometric titration of the mixed sodium-potassium salt of A204 II in a 66 percent dimethylformamide-water solution revealed the presence of one titratable group of pk'a=6.3.

The precise molecular weight of A204 II has not yet been determined.

An average of several elemental analyses of the crystalline mixed sodium-potassium salt of A204 II, dried in vacuo at about 80°C. over phosphorus pentoxide, gave the following values:

| ELEMENT | PERCENT |
| --- | --- |
| Carbon | 60.66 |
| Hydrogen | 8.76 |
| Oxygen | 27.09 |

Several atomic absorption analyses indicated that the compound was a mixed sodium-potassium salt and contains one mole of mixed cation per mole of A204 II.

Figure 3:
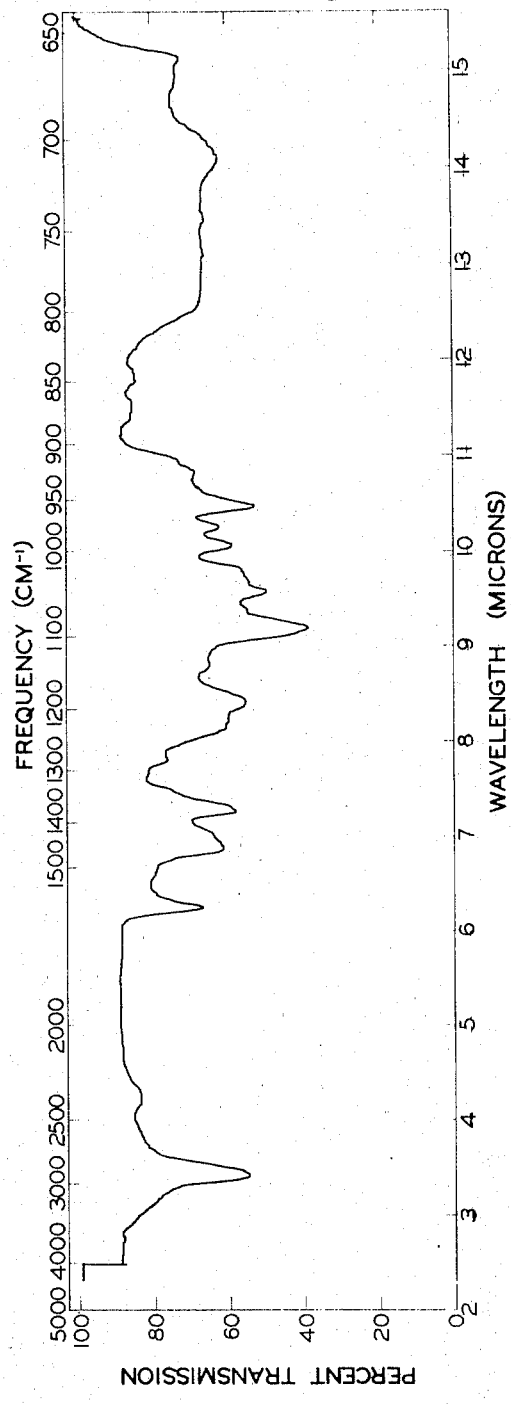

The infrared absorption spectrum of the mixed sodium-potassium salt of A204 II in chloroform as shown in FIG. 3 of the drawings has the following distinguishable bands in the infrared spectrum over the range of 2.0 to 15.0 microns: 3.20; 3.45; 6.26; 6.90; 7.30; 7.80; 8.20; 8.50; 8.80; 9.22; 9.39; 9.59; 9.70; 9.82; 10.08; 10.26; 10.48; 10.83; 10.96; 11.30; 11.55; and 11.78 microns.

The mixed sodium-potassium salt of A204 II has no characteristic ultraviolet absorption pattern.

Thin-layer chromatography of the mixed sodium-potassium salt of A204 II on silica gel plates gave an $R_f$ value of 0.75 in an ethyl acetate system using a sulfuric acid spray for detection.

A204 has not been definitively characterized. X-ray diffraction studies have shown the A204 is made up of linked oxygen-containing rings and contains one carboxylic acid group and at least one hydroxyl group. Therefore, the structural features of A204 are closely related to the structural features of the other antibiotics named here.

Antibiotic A204 can be produced by culturing a certain strain of *Streptomyces albus* under aerobic conditions in a culture medium containing assimilable sources of carbon, nitrogen, and inorganic salts. The organisms were first isolated from soil samples obtained from Perry, Fla.

The novel organism capable of producing antibiotic A204 has been placed on permanent deposit, without restriction, with the culture collection of the Northern Utilization Research and Development Division, Agricultural Research Service, U.S. Department of Agriculture, Peoria, Ill., and is available to the public under culture No. NRRL 3384.

Because of the uncertainty of taxonomic studies with the Streptomyces group of organisms, there is always an element of doubt associated with the identification of a newly discovered organism. However, the organism which produces antibiotic A204 appears to resemble most nearly, in its most important characteristics, the published descriptions of the organisms *Streptomyces albus*, *Streptomyces albidoflavus*, and *Streptomyces flaveolus*. However, I consider the culture to be a strain of *S. albus*, (*Rossia Doria*) Waksman and Henrici, based upon the description of the neotype strain of *S. albus* ATCC 3004 by Lyons and Pridham, [*J. Bacteriol.* 83: 370–80 (1962)], and the *S. albus* strain of IMRU 3005 described by Waksman [*The Actinomycetes*, Vol. II "Classification, Identification, and Description of Genera and Sepcies," Williams and Wilkins Co., Baltimore (1961)].

Several fermentation media can be employed to produce A204. Media include a carbon source such as glucose, fructose, starch, brown sugar, and the like; a nitrogen source such as soybean meal, cornsteep solids, yeast, peptones and the like; and nutrient inorganic salts. The initial pH of the medium should be 6.5 to 7.5

A204 is best produced in submerged aerobic cultures. The best method of production is begun by inoculating a starter tank of sterile medium with a vegetative inoculum. When the culture in the starter tank is growing actively, it is transferred to the production tank.

Maximum production of A204 occurs within about 48–72 hours after inoculation of the culture medium. The production temperature range is from about 25° to about 37°C. Sterile air should be blown through the medium at rates from about 0.2 to about 0.4 times the volume of the tank per minute.

A204 is recovered by extraction of both the fermentation broth and the mycelium. It can be isolated in the free acid form, or as a salt, by adjusting the pH of the broth. A water-immiscible solvent such as ethyl acetate is used for extraction. The extracted antibiotic is purified by chromatography followed by recrystallization.

The following example more fully illustrates the production of A204.

EXAMPLE 2

Spores of *Streptomyces albus* NRRL 3384 are inoculated on a nutrient agar slant made up of 10 g. of dextrin, 2 g. of an enzyme digested casein, 1 g. of beef extract, 1 g of yeast extract, 20 g. of agar and sufficient water to make a total volume of 1 liter. The slants are incubated for 4 to 5 days at 30°C. The slants are covered with sterile distilled water and gently scraped to remove the organisms and provide an aqueous suspension thereof. One millimeter of the resulting spore suspension is used to inoculate each 100 ml. portion of the vegetative medium.

The vegetative culture medium is prepared by combining 15 g. of glucose, 15 g. of soybean meal, 5 g. of corn-steep solids, 5 g. of sodium chloride, 2 g. of calcium carbonate, and sufficient tap water to make the total volume 1 liter. The vegetative inoculum is shaken for 48 hours at 30°C. on a reciprocal shaker having a 2-inch stroke at 108 rpm. The inoculum so prepared is then utilized in the production of antibiotic A204 as follows.

A production medium is prepared having the following composition:

| | |
|---|---|
| Soybean meal | 15 g./l. |
| Casein | g./l. |
| NaNO₃ | 3 g./l. |
| Glucose syrup | 20 g./l. |
| CaCO₃ | 2.5 g./l. |
| Tap water | |

One hundred milliliter portions of the production medium are placed in 500 milliliter Erlenmeyer flasks, which are then sterilized at 120°C. for 30 minutes. When cooled, each flask is inoculated with 5 percent of vegetative inoculum prepared as previously described.

The production flasks are shaken for 48 hours at 30°C., on a rotary shaker operating at 250 rpm. The pH of one uninoculated medium varies over a pH range of 6.5 to 7.5. The harvest pH at the end of the fermentation cycle is 7.0 to 7.6. The antibiotic acitivty is found in both the broth and the mycelium. This activity is determined by assaying the broth and the mycelium against *Bacillus subtilis*, using known disc or cupplate methods.

The whole broth (25 liters) obtained by the above procedure, is filtered in vacuo with the aid of diatomaceous earth. The mycelial cake is extracted three times with one-half volume of 50 percent aqueous methanol. The three mycelial extracts are combined and concentrated in vacuo to remove the methanol. The filtered broth and the aqueous concentrate of the mycelial extract solutions are combined, the pH of the mixture adjusted to pH 3 with hydrochloric acid, and the solution extracted two times with one-half volume of ethyl acetate. The ethyl acetate extracts are combined and concentrated to dryness, redissolved in chloroform (10 ml. for each gram of solids), and the chloroform solution passed through a 12 inch × 40 inch column of Pittsburgh carbon containing 2 g. of carbon for each gram of solids. The column is then eluted with 5 to 10 times the original volume of chloroform.

The chloroform eluate fractions are combined, concentrated to dryness in vacuo, dissolved in a small amount of warm methanol, chilled, and the resulting crystals filtered. Recrystallization produces 8.9 g. of antibiotic A204 crystals having a potency of from 1,200 to 1,400 microbiological units/mg. The crystals are identified as antibiotic A204 by NMR, IR, thin-layer chromatographic, and paper chromatographic studies. et al., *J. Am. Chem. Soc.* 73, 5295–98 (1951). The Streptomyces organism from which it can be grown is available from the International Center of Information on Antibiotics, c/o L. Delcambe, 32, Bd. de la Constitution, Liege, Belgium, which lists the organism on page 31 of its Bulletin No. 3 (1966).

X206 has been characterized as a molecule very similar to the other antibiotic compounds of my method.

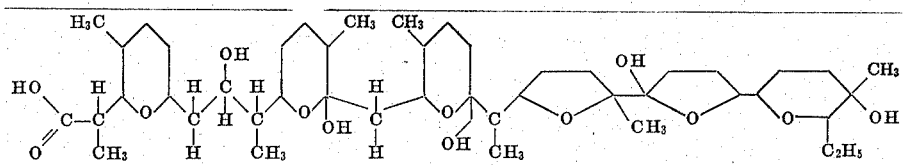

Blount et al., *Chemical Communications*, 1971, 927–28.

The same article illustrates X206 as being wrapped around a monovalent metal ion in the same way that the other antibiotics complex with ions. The compound is aptly described as ". . . wrapped around the silver in such a way that its backbone describes a path similar to that of the seam on a tennis ball."

The general methods of producing X206 are very similar to the methods of producing nigericin which have been described. X206 is harvested from both the fermentation broth and from the cells. After filtration of the broth, it is extracted with an ester solvent. The solvent is concentrated and extracted with an aqueous buffer at alkaline pH. The product is in the solvent phase.

The cells are extracted with alcohol and concentrated. The concentrate is extracted with an ester solvent, which is concentrated. Chromatography of both of the extracts isolates X206.

The following example illustrates the production of X206.

EXAMPLE 3

The Streptomyces organism, obtained from the I.C.I.A. as above, is used to grow a vegetative inoculum.

Spores are inoculated on agar slants made as follows.

| | |
|---|---|
| 10 g. | dextrin |
| 2 g. | enzyme-digested casein |
| 1 g. | beef extract |
| 1 g. | yeast extract |
| | water to make 1 liter |

After 3 days at 28°C., spores are harvested from the slants and transferred to a 30-liter starter tank. The transfer is under aseptic conditions, and the tank and medium are sterilized before inoculation. The following medium is used.

| | |
|---|---|
| 3% | soybean flour |
| 2% | brown sugar |
| 0.5% | cornsteep liquor |
| 0.1% | $K_2HPO_4$ |

The starter tank is supplied with 1 cubic foot per minute of sterile air which is bubbled through the medium. After 3 days of growth at 28°C., the starter tank is harvested. Its contents are transferred aseptically to a 550 l. production tank containing the above medium. Production of X206 reaches its maximum after 6 days of growth at 28°C. The fermentation is supplied a continuous flow of 20 c.f.m. of sterile air.

The fermentation broth is filtered with diatomaceous earth filter aid. X206 is present in both the filter cake and the filtrate.

To the filtrate is added 10 percent of NaCl and 50 percent of butyl acetate. After 30 minutes' stirring, the organic layer is separated and concentrated to 5 percent of its volume. The solution is then extracted with ice-cold 0.2M $K_2HPO_4$ with KOH added to pH 8.9. The organic phase is then concentrated to 1 liter.

Xylene is added, and concentrate is further concentrated to 60 g., which is dissolved in 200 ml. of benzene and adsorbed on a 500 g. activated alumina column. More benzene is added to develop the chromatogram, and the active material is then eluted with ether containing increasing amounts of ethanol up to 23 percent. The fractions active against Bacillus E are collected.

X206 is harvested from the cells as follows. The filter cake is extracted first with 30 L. of ethanol and then with 200 l. of methanol. The combined alcohol solutions are concentrated to 4 l. and mixed with 10 l. of butyl acetate. The resulting solution is extracted with alkaline ice-cold 0.2M $K_2HPO_4$ solution.

The organic phase is then further concentrated and chromatographically purified in the same manner used for the harvest from the filtrate.

The fractions assaying active against Bacillus E are further purified by dissolving in the smallest possible amount of ether. Then petroleum ether is added and the ether evaporated off. The mixture is cooled at 0°C. for a day and then filtered. The filtrate is concentrated further and the precipitation from petroleum ether is repeated.

The second filtered solution is evaporated and the oily residue dissolved in ether. A large amount of petroleum ether is added and the mixture concentrated with heat until X206 crystallizes. The crystals are the mixed sodium-potassium salt, m.p. 201°–03°C.

The free acid, m.p. 126°–28°C., is prepared by sulfuric acid treatment of the salt above. It is optically active, $[\alpha]_D^{29} + 15°$ in methanol has no UV characteristic absorption, and is soluble in alcohols, esters, acetone, ether, and petroleum ether, almost insoluble in water and aqueous bases. It is not stable in mineral acid or strong bases. Analysis of the crystalline acid finds 63.32% C; 9.64% H; 26.90% O.

Some salts of X206 have been found to have the following melting points.

| | |
|---|---|
| Sodium | 185°–87°C. |
| Potassium | 211°–13°C. |
| Silver | 153°–56°C. (dec.) |
| Barium | 149.5°–56°C. |

The antibiotic X537A has been disclosed and structurally characterized in Netherlands Pat. No. 70.12,108. The structure is shown below.

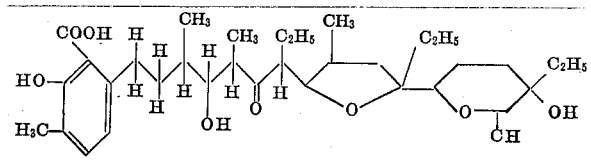

The organism by which X537A is produced by fermentation is on deposit at the International Center of Information on Antibiotics, c/o L. Delcambe, 32, Bd. de la Constitution, Liege, Belgium. The organism is listed on page 41 of the Center's Bulletin No. 3 (1966).

X537A is produced by growing the organism on agar slants for 4 to 6 days. Spores are harvested from the slants and inoculated into shaker flasks containing a medium containing complex nitrogen sources such as soybean meal, cornsteep solids, distillers' residues, or the like. After about 2 to 4 days of growth, the inoculum is used to start cultures in production shaker flasks.

Suitable production media may be based on carbon sources such as starches, sugars, and the like, and on nitrogen sources such as enzyme-digested casein. Maximum production is obtained after about 2 to 3 days' growth at about 25°–30+C. Initial pH of the medium should be about 6.0 to 7.5, and harvest pH should be about 6.5 to 8.0.

Most of the X537A is in the cells. It is isolated by filtering the solids from the fermentation broth and extracting the filter cake with an ester solvent. X537A is precipitated by concentration of the extract, washing with base, further concentration, and addition of petroleum ether. It is purified by recrystallization.

The following example provides a detailed process for making X537A.

EXAMPLE 4

The X537A-producing organism obtained from the I.C.I.A. is inoculated on slants of the following agar.

10 g./l. dextrin
2 g./l. N-Z amine A
1 g./l. beef extract
1 g./l. yeast extract
20 g./l. agar
distilled water The cultures are grown for 6 days at 30°C. Then spores are aseptically harvested as a suspension in sterile water.

That spore suspension is used to inoculate starter cultures of the following sterile medium. One ml. of spore suspension is added to each 100 ml. of medium.

15 g./l. cerelose
15 g./l. soybean meal
5 g./l. cornsteep solids
2 g./l. $CaCO_3$
5 g./l. NaCl
tap water Starter cultures are grown in 500 ml. shaker flasks on 250-rpm rotary shakers for 36 hours at 30°C.

The harvested starter cultures are used to inoculate production flasks by aseptically adding 5 ml. of starter culture to each 100 ml. of sterile production medium. The following production medium is used.

20 g./l. cerelose
10 g./l. soluble starch
30 g./l. peptone
4 g./l. N-Z amine A
5 g./l. $MgSO_4 \cdot 7H_2O$
5 g./l. black strap molasses
2 g./l. $CaCl_3$
tap water Initial pH of the medium is 7.0. The 500-ml. production flasks are shaken for 3 days at 30°C. on a 250-rpm rotary shaker. Final pH at harvest is 7.5.

X537A is isolated from the broth in the following manner. Fifty liters of broth is filtered with diatomaceous filter aid. The wet filter cake is suspended in 25 l. of butyl acetate, and the mixture is stirred overnight at room temperature. That mixture is filtered again, and the water layer of the filtrate is discarded. The butyl acetate layer is concentrated in vacuum to about 750 ml., washed with 10 percent sodium carbonate solution, and dried over anhydrous sodium sulfate. The dried solution is concentrated again to 75 ml. and diluted with an equal volume of petroleum ether. A solid material separates, which is then extracted in a Soxhlet apparatus with 1.1 of petroleum ether for 2 days. The extract is evaporated to dryness, and the residue is suspended in 25 ml. of petroleum ether and filtered, yielding a sodium salt of X537A. The salt is recrystallized from ether-petroleum ether.

The sodium salt is converted to the acid by being dissolved in ether and washed with dilute sulfuric acid. Removal of the ether leaves an oily residue which crystallizes from ethanol. The recrystallized acid has a vague melting point of 100°–09°C. The optical rotation of the acid is $[\alpha]_D^{26}$ −7.2° (methanol). The ultraviolet absorption spectrum of the acid shows maxima at 317 m$\mu$ and 249 m$\mu$. Microanalysis finds 67.88 percent carbon, and 9.48 percent hydrogen.

The barium salt, m.p. 156°–60°C., the potassium salt, m.p. 177°–78°C., and the sodium salt are conveniently prepared from the free acid by shaking solutions of the free acid in ether with aqueous solutions of the metal hydroxide or carbonate. The salt is in the ether phase in each case. The sodium salt, recrystallized from benzene-ligroin and dried at 100°C., has m.p. of 168°–71°C., and $[\alpha]_D^{26}$ −30° (methanol).

The antibiotics which are operable in my method are all acids or derivatives of acids. They have the common property of organic acids of forming salts. Representatives of the inorganic bases forming physiologically-acceptable cationic salts with the antibiotics include the alkali metal hydroxides such as lithium hydroxide, sodium hydroxide and potassium hydroxide; the alkali metal carbonates and bicarbonates such as lithium carbonate, sodium carbonate, sodium bicarbonate and potassium carbonate; the alkaline earth metal hydroxides and carbonates such as calcium hydroxide, magnesium carbonate, magnesium hydroxide, strontium carbonate; and like inorganic bases.

Illustrative of the organic bases forming physiologically-acceptable salts with the antibiotics are the primary, secondary and tertiary $C_1$–$C_4$ lower alkyl and lower hydroxyalkyl amines such as methylamine, ethylamine, n-propylamine, isopropylamine, sec-butylamine, diethylamine, di-n-butylamine, triethylamine, di-isopropylamine, methyl-n-butylamine, methylethylamine, ethanolamine, diethanolamine, 3-hydroxypropylamine, di(3-hydroxypropyl)-amine, 4-hydroxy-butylamine and the like.

The ammonium salts of the antibiotics are prepared with ammonia or ammonium hydroxides.

The alkali metal and alkaline earth metal cationic salts of the antibiotics are prepared according to procedures commonly employed for the preparation of cationic salts. For example, the free acid form of the antibiotic is dissolved in a suitable solvent such as warm methanol or ethanol and an aqueous methanol solution of the desired inorganic base is added to the antibiotic solution. The antibiotic cationic salts can be isolated by filtration and recrystallization or by evaporation of the solvent and purification by recrystallization.

The salts formed with organic amines can be prepared in a similar manner. For example the gaseous or liquid amine can be added to a solution of the antibiotic in a suitable solvent such as acetone and the solvent and excess amine can be removed by evaporation.

Physiologically acceptacle esters can readily be made on the acid group of the antibiotics of my method. For example, alkyl esters such as methyl, isopropyl, and butyl, cycloalkyl esters such as cyclopropyl and cyclohexyl, and aryl esters such as phenyl are made by reaction of the acid with a diazo derivative of the substituent to be added. The reaction goes with stirring at room temperature in a suitable solvent such as ether.

Esters can also be made by acylation of one or more of the hydroxy groups of these antibiotics. For example, esters are made by acylation with groups such as formyl, acetyl, hexanoyl and benzoyl by reaction with an anhydride of the group to be added. Reaction occurs in pyridine at room temperature overnight.

It is well known in the veterinary pharmaceutical art that the ester or salt form of an antibiotic is immaterial in the treatment of an animal with the antibiotic. Conditions within the animal frequently change the drug to forms other than that in which it was administered. Therefore, the ester or salt form in which it may be administered is insignificant to the method of treatment and may be chosen for reasons of economics, convenience, and toxicity.

The experimental examples which follow show that the antibiotic molecules which have been modified by formation of physiologically-acceptable esters and salts are effective in my method. The terms X206, A204, nigericin, X537A, monensin, and dianemycin are used in this specification and claims to include physiologically-acceptable esters and salts of those antibiotics.

The effectiveness of my method of modifying the ratio of volatile fatty acids produced in the rumen was first proven by means of in vitro tests. The test method I used is shown below.

EXAMPLE 5

Rumen fluid is obtained from a steer which has a surgically-installed fistula opening into the rumen. The steer is maintained on a high-grain ration, the composition of which follows:

| | |
|---|---|
| 69.95% | coarse ground corn |
| 10% | ground corncobs |
| 8% | soybean meal (50% protein) |
| 5% | alfalfa meal |
| 5% | molasses |
| 0.6% | urea |
| 0.5% | dicalcium phosphate |
| 0.5% | calcium carbonate |
| 0.3% | salt |
| 0.07% | vitamin A and $D_2$ premix |
| 0.05% | vitamin E premix |
| 0.03% | trace mineral premix |

A sample of rumen fluid is strained through four layers of cheesecloth and the eluate is collected in a vacuum bottle. The particulate matter retained by the cheesecloth is resuspended in enough physiological buffer to return it to the original volume of the rumen fluid, and the eluate is strained again. The buffer used is described below:

| | |
|---|---|
| 0.316 g./liter | $Na_2HPO_4$ |
| 0.152 g./liter | $KH_2PO_4$ |
| 2.260 g./liter | $NaHCO_3$ |
| 0.375 g./liter | KCl |
| 0.375 g./liter | NaCl |
| 0.112 g./liter | $MgSO_4$ |
| 0.038 g./liter | $CaCl_2$ |
| 0.008 g./liter | $FeSO_4 \cdot 7H_2O$ |
| 0.004 g./liter | $MnSO_4$ |
| 0.004 g./liter | $ZnSO_4 \cdot 7H_2O$ |
| 0.002 g./liter | $CuSO_4 \cdot 5H_2O$ |
| 0.001 g./liter | $CoCl_2$ |

Cheng et al., *J. Dairy Sci.* 38, 1225, (1955).

The two eluates are pooled in a separatory funnel and allowed to stand till particulate matter separates to the top. The clear layer is then diluted 1:1 with the same buffer, and adjusted to pH 7.0.

Ten ml. of the diluted rumen fluid is placed in a 25 ml. flask with 40 mg. of the same feed shown above. Five mg. of soybean protein is also added per flask. The compound to be treated is weighed into each test flask. Four replicate flasks are used per treatment. Two sets of four control flasks each are also employed. A zero-time control is used, and also an incubated 16-hour control. All of the test flasks are incubated for 16 hours at 38°C. At the end of incubation, the pH is measured and 2 ml. of 25 percent metaphosphoric acid is added to each flask. The samples are allowed to settle. The supernatant is analyzed by gas chromatographic methods for volatile fatty acids.

Analyses for acetate, propionate, and butyrate compounds are performed. The results are statistically compared with the results of analyses of the control flasks. Treatments with propionate production significantly higher than the controls are regarded as active treatments.

The table below shows the ratio of VFA concentrations in treated flasks to concentrations in control flasks. The data are means where a given test has been repeated.

| Compound | Rate | Acetate | Propionate | Butyrate |
|---|---|---|---|---|
| Monensin Na Salt | 50 mcg./ml. | 0.89 | 1.90 | 0.56 |
| | 25 mcg./ml. | 0.94 | 1.91 | 0.49 |
| | 10 mcg./ml. | 0.94 | 1.56 | 0.80 |
| | 5 mcg./ml. | 0.81 | 1.91 | 0.70 |
| | 1 mcg./ml. | 0.98 | 1.69 | 0.59 |
| | 100 mcg./ml. | 1.08 | 0.96 | 0.84 |
| | 2 mcg./ml. | 0.91 | 1.76 | 0.95 |
| Monensin diacetate | 50 mcg./ml. | 1.05 | 1.27 | 0.65 |
| | 25 mcg./ml. | 1.05 | 1.04 | 0.86 |
| | 10 mcg./ml. | 0.97 | 1.26 | 0.82 |
| | 5 mcg./ml. | 1.11 | 0.97 | 0.86 |
| | 1 mcg./ml. | 1.09 | 0.93 | 0.92 |
| A204 T | 25 mcg./ml. | 1.06 | 1.83 | 0.39 |
| A204 II | 25 mcg./ml. | 1.00 | 1.49 | 0.67 |
| | 10 mcg./ml. | 0.90 | 1.55 | 0.86 |
| | 1 mcg./ml. | 0.98 | 1.28 | 0.86 |
| Nigericin | 25 mcg./ml. | 0.84 | 1.63 | 0.85 |
| | 10 mcg./ml. | 0.74 | 1.73 | 0.89 |
| | 5 mcg./ml. | 0.86 | 1.72 | 0.70 |
| | 1 mcg./ml. | 0.94 | 1.38 | 0.84 |
| | 0.2 mcg./ml. | 0.97 | 1.14 | 0.88 |
| Dianemycin | 25 mcg./ml. | 1.00 | 1.74 | 0.63 |
| | 10 mcg./ml. | 0.92 | 1.56 | 0.79 |
| | 5 mcg./ml. | 1.03 | 1.60 | 0.66 |
| | 1 mcg./ml. | 0.98 | 1.29 | 0.86 |
| | 0.2 mcg./ml. | 1.03 | 1.13 | 0.87 |
| X537A | 10 mcg./ml. | 0.83 | 1.80 | 0.73 |
| | 5 mcg./ml. | 0.82 | 2.03 | 0.71 |
| | 1 mcg./ml. | 0.96 | 1.23 | 0.88 |
| | 0.2 mcg./ml. | 1.02 | 1.06 | 0.95 |

EXAMPLE 6

The following tests were done in exactly the same way except that the rumen fluid which was put into the system was obtained from slaughtered sheep, rather than fistulated cattle.

| Compound | Rate | Acetate | Propionate | Butyrate |
|---|---|---|---|---|
| Monensin Na Salt | 50 mcg./ml. | 0.97 | 1.77 | 0.39 |
| Monensin Na Salt | 10 mcg./ml. | 0.94 | 1.79 | 0.45 |

EXAMPLE 7

In order to prove that my method is not limited to ruminants fed on high-protein or high-frequency diets, the following in vitro experiment was performed. The procedure was exactly as Example 5 except that the rumen fluid was obtained from a steer on all-roughage diet. The substrate supplied to the flasks was ground alfalfa hay. The test compound was monensin sodium salt.

| Rate | Acetate | Propionate | Butyrate |
|---|---|---|---|
| mcg./ml. | 0.87 | 1.34 | 0.85 |
| 5 mcg./ml. | 0.86 | 1.34 | 0.84 |
| 1 mcg./ml. | 0.96 | 1.11 | 1.06 |
| 0.2 mcg./ml. | 0.99 | 1.05 | 1.13 |
| 0.04 mcg./ml. | 1.00 | 1.00 | 1.03 |

The data above shows that my method is effective in increasing production of propionates in the rumen of animals on a low-energy diet.

The data tabulated above shows that all the antibiotics named are effective in increasing propionate production in the rumen, regardless of the form in which the antibiotic is fed and regardless of the diet which the ruminants may be fed.

Further tests have been conducted in vivo to assure that the beneficial increase in propionate production is not an artifact of the in vitro test method. The tests were performed in animals which have had fistulas installed in their rumens. It is thus possible to withdraw specimens of the contents of the rumen.

The animal is fed a known amount of a known diet each day containing an accurately measured dose of the compound. If the animal should choose not to eat his whole daily ration, the uneaten portion is placed directly in the rumen through the fistula. Two hours after feeding a sample of the rumen fluid is taken from the animal and several 100 ml. aliquots are placed in flasks. Fermentation is stopped immediately in some of the flasks by addition of 50 ml. of 25 percent metaphosphoric acid. The other flasks are incubated at 38°C. After 1 hour, fermentation in the incubated flasks is stopped in the same way.

Thus, the production of VFA's in the rumen fluid is measured over a 1-hour period, without the interference of absorption from the rumen which is actually occurring in the animal at all times.

The contents of each flask are strained through four layers of cheesecloth and centifuged at 1,500 rpm for 10 minutes. The eluate is analyzed for VFA contents by a gas chromatograph. The production of acetate, propionate, and butyrate over the 1-hour period is determined by zero-time the zero-rime concentrations from the concentrations measured in the incubated samples. Zero-time production rates are determined by describing the change in concentration as a function of the time of incubation.

EXAMPLE 8

The test reported in the following table was conducted with mature fistulated steers weighing about 1,000 kg. each. Two steers were fed a normal diet, similar to the high-grain feed shown above, and two steers in each treatment group were fed the identical diet but with monensin sodium salt added. The results below are shown as the changes in the concentrations in the rumen of acetate, propionate, and butyrate measured in millimoles per liter of rumen fluid. The number reported is the concentration of the treated samples, averaged over four analyses in a 14-day treatment period, minus the average concentration during a control period before treatment.

| Level | Acetate | Propionate | Butyrate |
|---|---|---|---|
| Control | −5.7 | −1.3 | −1.5 |
| Control | 6.0 | 5.4 | 2.8 |
| 0.2 mg./kg./day | −3.2 | 10.9 | −3.1 |
| 0.5 mg./kg./day | −0.8 | 30.1 | −7.0 |
| 0.5 mg./kg./day | 4.4 | 17.2 | −3.3 |

The data from the cattle test above can also be shown as changes in propionate production. The table below shows the ratio of propionate production of the cattle during the treatment period to the propionate production of the same cattle during a control period before treatment.

| Monensin Level | Ratio of Production |
|---|---|
| Control | 1.06 |
| Control | 1.05 |
| 0.2 mg./kg./day | 1.60 |
| 0.5 mg./kg./day | 2.43 |
| 0.5 mg./kg./day | 2.12 |

It is clear that propionate production is sharply increased over control animals when monensin is added to the cattle's diet.

EXAMPLE 9

Similar tests were performed with fistulated sheep. The results of those tests, expressed as changes in concentrations, are shown in this table.

| Level | Acetate | Propionate | Butyrate |
|---|---|---|---|
| Control | 20.6 | 2.7 | 3.7 |
| 0.8 mg./kg./day | 14.4 | 14.8 | −0.3 |
| 1.0 mg./kg./day | 9.8 | 14.9 | −1.3 |

It will be seen that the monensin treatments reduced acetate concentration as compared with the controls. It is obvious that the propionate concentration was increased by treatment with monensin.

The tests which have been reported above also showed subjective evidence of reduced susceptibility to bloat of the treated animals. Bloat is a highly harmful condition which results from excess gas accumulation in the rumen. The afflicted animal is unable to dispose of the gas by eructation due to the entrapment of gas in a stable foam. Foaminess of the rumen is a predisposing factor for bloat.

The animals treated in the tests shown above had rumen contents before treatment with monensin which were consistently quite foamy. The operators performing the tests noticed foaminess in the control animals and in the treated animals before treatment was begun. However, as soon as treatment with the antibiotic compound was begun, the foaminess in treated cattle decreased. The change in foaminess of rumen contents was observed in five of the six treated cattle. Thus, it is believed that an additional benefit of oral administration of the antibiotic compounds of my method is a decreased susceptibility to bloat.

EXAMPLE 10

Six fistulated Hereford heifers weighing an average 325 kg. were randomly allotted to three groups. All groups were given monensin sodium salt in their diet at the rates shown in the table.

On the ninth and sixteenth days of monensin administration, samples of rumen contents were taken from each animal and analyzed for VFA. The data are reported as ratios of molar concentrations, in the order acetate/propionate/butyrate.

The data shows very clearly the beneficial effects of my method of increasing feed utilization by increasing propionate concentration in the rumen.

The published control ratio is 2.90/1/0.64. Hungate, *The Rumen and Its Microbes*, page 270, Academic Press.

Monensin Rate

|  | 1.3 mg./kg./day | 1.7 mg./kg./day | 2.0 mg./kg./day |
|---|---|---|---|
| Ratio, Day 9 | 0.84/1/0.10 | 0.81/1/0.10 | 0.91/1/0.15 |
| Ratio, Day 16 | 1.09/1/0.11 | 1/1/0.11 | 1.03/1/0.12 |

In this experiment, the data shows that the animals' feed utilization has been changed dramatically. As compared with the control, the ratio of propionate to acetate has been tripled, and the ratio of propionate to butyrate has been increased by a factor of more than five.

Administration of the antibiotic compounds of my method prevents and treats ketosis as well as improves feed utilization. The causative mechanism of ketosis is a deficient production of propionate compounds. A presently recommended treatment is administration of propionic acid or feeds which preferentially produce propionates. It is obvious that my method, which encourages propionate production from ordinary feeds, will reduce incidence of ketosis.

I have found that monensin and the other antibiotic compounds of my method increase the efficiency of feed utilization in ruminant animals when they are administered orally to the animals. The easiest way to administer the antibiotics is by mixing them in the animals' feed. proper However, the antibiotic compounds can be usefully administered in other ways. For example, they can be incorporated into tablets, drenches, boluses, or capsules, and dosed to the animals. Formulation of the antibiotic compounds in such dosage forms can be accomplished by means of methods well known in the veterinary pharmaceutical art. Each individual dosage unit should contain a quantity of the feed-efficiency-improving compound which has a direct relation to the porper daily dose for the animal to be treated.

Capsules are readily produced by filling gelatin capsules with any desired form of the desired antibiotic. If desired, the antibiotic can be diluted with an inert powdered diluent, such as a sugar, starch, or purified crystalline cellulose in order to increase its volume for convenience in filling capsules.

Tablets of the antibiotics of my method are made by conventional pharmaceutical processes. Manufacture of tablets is a well-known and highly advanced art. In addition to the active ingredient, a tablet usually contains a base, a disintegrator, an absorbent, a binder, and a lubricant. Typical bases include lactose, fine icing sugar, sodium chloride, starch and mannitol. Starch is also a good disintegrator as is alginic acid. Surface active agents such as sodium lauryl sulfate and dioctyl sodium sulphosuccinate are also sometimes used. Commonly-used absorbents again include starch and lactose while magnesium carbonate is also useful for oily substances. Frequently used binders are gelatin, gums, starch, dextrin and various cellulose derivatives. Among the commonly used lubricants are magnesium stearate, talc, paraffin wax, various metallic soaps, and polyethylene glycol.

My method can also be practiced by the administration of the antibiotic compound as a slow-pay-out bolus. Such boluses are made as tablets are made except that a means to delay the dissolution of the antibiotic is provided. Boluses are made to release for lengthy periods. The slow dissolution is assisted by choosing a highly water-insoluble form of the antibiotic. A substance such as iron filings is added to raise the density of the bolus and keep it static on the bottom of th rumen.

Dissolution of the antibiotic is delayed by use of a matrix of insoluble materials in which the drug is embedded. For example, substances such as vegetable waxes, purified mineral waxes, and water-insoluble polymeric materials are useful.

Drenches of my antibiotics are prepared most easily by choosing a water-soluble form of the antibiotic. If an insoluble form is desired for some reason, a suspension may be made. Alternatively, a drench may be formulated as a solution in a physiologically acceptable solvent such as a polyethylene glycol.

Suspensions of insoluble forms of my antibiotics can be prepared in nonsolvents such as vegetable oils such as peanut, corn, or sesame oil; in a glycol such as propylene glycol or a polyethylene glycol; or in water, depending on the form of the antibiotic chosen.

Suitable physiologically-acceptable adjuvants are necessary in order to keep the antibiotic suspended. The adjuvants can be chosen from among the thickeners, such as carboxymethylcellulose, polyvinylpyrrolidone, gelatin, and the alginates. Many classes of surfactants serve to suspend antibiotics. For example, lecithin, alkylphenol polyethylene oxide adducts, naphthalenesulfonates, alkylbenzenesulfonates, and the polyoxyethylene sorbitan esters are useful for making suspensions in liquid nonsolvents.

In addition many substances which effect the hydrophilicity, density, and surface tension of the liquid can assist in making suspensions in individual cases. For example, silicone anti-foams, glycols, sorbitol, and sugars can be useful suspending agents.

The suspendable antibiotic may be offered to the grower as a suspension, or as a dry mixture of the antibiotic and adjuvants to be diluted before use.

My antibiotics may also be administered in the drinking water of the ruminants. Incorporation into drinking water is performed by adding a water-soluble or water-suspendable form of the desired antibiotic to the water in the proper amount. Formulation of the antibiotic for addition to drinking water follows the same principles as formulation of drenches.

The most practical way to treat animals with the antibiotic compounds of my method is by the formulation of the compound into the feed supply. Any type of feed may be medicated with the antibiotic compounds, including common dry feeds, liquid feeds, and pelleted feeds.

The methods of formulating drugs into animal feeds are well known. It is usual to make a concentrated drug premix as a raw material for medicated feeds. For example, typical drug premixes may contain from about 1 to about 400 grams of drug per pound of premix. The wide range results from the wide range of concentration of drug which may be desired in the final feed. Premixes may be either liquid or solid.

The formulation of ruminant feeds containing the proper amounts of my antibiotic compounds for useful treatment is mainly a matter of arithmetic. It is necessary only to calculate the amount of compound which it is desired to administer to each animal, to take into account the amount of feed per day which the animal eats and the concentration of antibiotic compound in the premix to be used, and calculate the proper concentration of antibiotic compound in the feed.

All of the methods of formulating, mixing, and pelleting feeds which are normally used in the ruminant feed art are entirely appropriate for manufacturing feeds containing the antibiotic compounds of my method.

It is not my intention to limit the scope of my invention to any particular formulations or methods of administration. My invention is a method of increasing the efficiency of feed utilization by ruminant animals by the oral administration of certain antibiotics. However the administration may be accomplished, it remains my method.

It is usual to treat economic animals, including ruminants, with a variety of growth promoters, disease-preventives, and disease treatments throughout their lives. Such drugs are often used in combination. My method may be practiced in combination with other treatments.

I claim:

1. A method of increasing the efficiency of feed utilization of ruminant animals having a developed rumen function which comprises the oral administration to such animals of a propionate-increasing amount of an antibiotic chosen from the group consisting of X537A and its physiologically acceptable esters and salts.

2. A method of claim 1 wherein the ruminant animals are cattle.

3. A method of claim 1 in which the ruminant animals are sheep.

4. A method of claim 1 in which the compound is administered at a rate of from about 0.05 mg./kg./day to about 5 mg./kg./day.

5. A method of claim 1 in which the compound is administered at a rate of from about 0.1 mg./kg./day to about 2.5 mg./kg./day.

6. A method of claim 5 in which the ruminant animals are cattle.

7. A method of claim 5 in which the ruminant animals are sheep.

* * * * *

PO-1050
(5/69)

UNITED STATES PATENT OFFICE
CERTIFICATE OF CORRECTION

Patent No. 3,794,732    Dated February 26, 1974.

Inventor(s)    Arthur P. Raun

It is certified that error appears in the above-identified patent and that said Letters Patent are hereby corrected as shown below:

In the drawings, Figures 1, 2, and 3 were canceled per Amendment after Notice of Allowance, mailed October 30, 1973.

Column 1, lines 24 and 25, "rumen" should read -- Rumen --.

In column 1, line 58, the word "feedstuffs" should read --Feedstuffs--.

In column 2, line 21, the word "animls" should read --animals--.

In column 2, line 53, the words "physiologically acceptable" should read --physiologically-acceptable--.

In the formula in columns 3 and 4, between lines 15-22, the formula should read as follows:

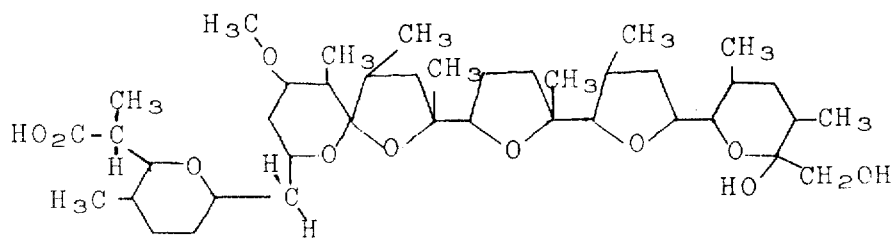

In column 5, line 12, the term "tap water" should be on the line below $K_2HPO_3$.

The text appearing at column 6, line 13 through column 8, line 30, was canceled per Amendment After Notice of Allowance, mailed October 30, 1973.

The text appearing at column 8, line 51 through column 10, line 32, was canceled per Amendment After Notice of Allowance, mailed October 30, 1973.

PO-1050
(5/69)

UNITED STATES PATENT OFFICE
CERTIFICATE OF CORRECTION

Patent No. 3,794,732     Dated February 26, 1974

Inventor(s) Arthur P. Raun     Page - 2

It is certified that error appears in the above-identified patent and that said Letters Patent are hereby corrected as shown below:

The following text was inserted at column 6, line 25, per the Amendment After Notice of Allowance, mailed October 30, 1973.
    --Antibiotic A204, and the methods by which it is produced, are described by Hamill et al., U. S. Patent 3,705,238, the specification and drawings of which are herein specifically incorporated by reference.--

In column 9, line 57, the line should read --Casein 1 g./l.-- not "Casein g./l.".

In column 9, line 70, "of one" should read --of the--.

In column 10, line 32, the sentence fragment beginning with "et al." should be preceded by the following text which begins a new paragraph.
    --Antibiotic X206 was first reported in 1951, Berger--

In column 11, line 37, the word "concentrate" should be preceded by the word --the--.

In column 11, line 45, the term "30 L." should read --30 l.--.

In the formula in column 12, lines 17-23, the extreme right-hand ring should read as follows:

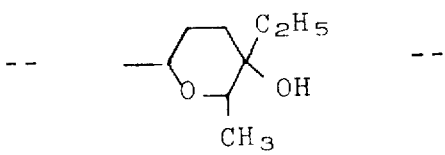

PO-1050
(5/69)

UNITED STATES PATENT OFFICE
CERTIFICATE OF CORRECTION

Patent No. 3,794,732  Dated February 26, 1974.

Page - 3

Inventor(s)   Arthur P. Raun

It is certified that error appears in the above-identified patent and that said Letters Patent are hereby corrected as shown below:

In column 12, line 44, the term "25°-30+C." should read --25°-30°C.---.

In column 13, line 40, the term "1.1" should read --1 1.---.

In column 16, line 14, the term "A204T" should read --A204I--.

In column 16, line 26, the number "0.95" should be in the Butyrate column, and the number "1.06" should be in the Propionate column.

In column 16, line 53, the term "high-frequency" should read --high-energy--.

In column 16, line 56, the word --an-- should precede the word "all-roughage".

In column 16, line 64, the first number in the left-hand column of the table under the heading "Rate" should read --25 mcg./ml.-- not "mcg./ml.".

In column 17, line 36, "by zero-time the zero-rime concentrations" should read --by subtracting the zero-time concentrations--.

In column 19, line 31, delete the word "proper".

In column 19, line 41, the word "porper" should read --proper--.

Signed and sealed this 22nd day of October 1974.

(SEAL)
Attest:

McCOY M. GIBSON JR.            C. MARSHALL DANN
Attesting Officer              Commissioner of Patents

REEXAMINATION CERTIFICATE (1365th)
United States Patent [19]

Raun

[11] B1 3,794,732

[45] Certificate Issued  Oct. 9, 1990

[54] RUMINANT FEED UTILIZATION IMPROVEMENT

[75] Inventor: Arthur P. Raun, New Palestine, Ind.

[73] Assignee: Eli Lilly and Company, Indianapolis, Ind.

Reexamination Reqs:st:
No. 90/001,073, Aug. 22, 1986
No. 90/001,104, Oct. 3, 1986

Reexamination Certificate for:
Patent No.: 3,794,732
Issued: Feb. 26, 1974
Appl. No.: 220,304
Filed: Jan. 24, 1972

[51] Int. Cl.$^5$ .............................................. A61K 31/35
[52] U.S. Cl. ..................................................... 514/460
[58] Field of Search .......................................... 514/460

[56] References Cited

U.S. PATENT DOCUMENTS

| | | | |
|---|---|---|---|
| 2,738,274 | 3/1955 | LeMense | 99/9 |
| 2,860,049 | 11/1958 | Schroder | 99/2 |
| 3,147,120 | 9/1964 | Caldwell | 99/2 |
| 3,522,353 | 7/1970 | Marco et al. | 424/317 |
| 3,531,571 | 9/1970 | Halleck | 424/265 |
| 3,564,098 | 2/1971 | Erwin et al. | 424/317 |
| 3,719,753 | 3/1973 | Berger | 424/283 |

FOREIGN PATENT DOCUMENTS

| | | |
|---|---|---|
| 721763 | 4/1969 | Belgium . |
| 1801228 | 5/1969 | Fed. Rep. of Germany . |
| 2036801 | 12/1969 | France . |
| 68/5988 | 9/1968 | South Africa . |
| 35068/372 | 6/1969 | Zimbabwe . |

OTHER PUBLICATIONS

Nutrient Requirements of Beef Cattle, No. 4, Fifth Revised Edition 1976, pages 28 & 29. Ensminger et al Sheet & Boat Science, Fifth Edition, Chapter 10, pages 190–192. Church-Digestive Physiology and Nutrition of Ruminants, Second Edition, 1969, pages 35–40. Land O'Lakes Veal Fast-Start Formulation, Publication, Land O'Lakes, Inc., Fort Dodge, Iowa.

*Primary Examiner*—Frederick E. Waddell

[57] ABSTRACT

Ruminant animals having a developed rumen function convert their feed more efficiently to energy when orally treated with an antibiotic chosen from among A204, X537A, dianemycin, monensin, nigericin, and X206 and their physiologically acceptable salts and esters.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-7 are cancelled.

* * * * *